(12) United States Patent
Smith et al.

(10) Patent No.: US 8,007,704 B2
(45) Date of Patent: Aug. 30, 2011

(54) INSERT MOLDED ACTUATOR COMPONENTS

(75) Inventors: Timothy J. Smith, Minneapolis, MN (US); Tzu-Yu Wang, Maple Grove, MN (US); Adam Z. Eskridge, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1078 days.

(21) Appl. No.: 11/458,718

(22) Filed: Jul. 20, 2006

(65) Prior Publication Data

US 2008/0029207 A1 Feb. 7, 2008

(51) Int. Cl.
*B29C 45/14* (2006.01)
(52) U.S. Cl. .................................. 264/272.11
(58) Field of Classification Search ............. 264/272.11
See application file for complete search history.

(56) References Cited

U.S. PATENT DOCUMENTS

| | | |
|---|---|---|
| 2,403,692 A | 7/1946 | Tibbetts |
| 2,975,307 A | 3/1961 | Shroeder et al. |
| 3,304,446 A | 2/1967 | Martinek et al. |
| 3,381,623 A | 5/1968 | Elliot |
| 3,414,010 A | 12/1968 | Sparrow |
| 3,641,373 A | 2/1972 | Elkuch |
| 3,769,531 A | 10/1973 | Elkuch |
| 3,803,424 A | 4/1974 | Smiley et al. |
| 3,947,644 A | 3/1976 | Uchikawa |
| 4,115,036 A | 9/1978 | Paterson |
| 4,140,936 A | 2/1979 | Bullock |
| 4,197,737 A | 4/1980 | Pittman |
| 4,415,607 A | 11/1983 | Denes et al. |
| 4,418,886 A | 12/1983 | Holzer |
| 4,453,169 A | 6/1984 | Martner |
| 4,478,076 A | 10/1984 | Bohrer |
| 4,478,077 A | 10/1984 | Boher |
| 4,498,850 A | 2/1985 | Perlov et al. |
| 4,501,144 A | 2/1985 | Higashi et al. |
| 4,539,575 A | 9/1985 | Nilsson |

(Continued)

FOREIGN PATENT DOCUMENTS

DE 19617852 1/1993

(Continued)

OTHER PUBLICATIONS

"Handbook of Physical Vapor Deposition (PVD) Processing", Mattox, D.M., 1998, William Andrew Publishing, pp. 92-100, 472-474, and 523-528. Accessed using www.knovel.com.*

(Continued)

*Primary Examiner* — Yogendra N Gupta
*Assistant Examiner* — Alison Hindenlang
(74) *Attorney, Agent, or Firm* — Seager, Tufte & Wickhem LLC

(57) ABSTRACT

The present invention relates to electrostatically actuated device components and methods of making the same. In an embodiment, the invention includes a method of making an electrostatically actuated device component including providing a multilayered structure comprising a first layer comprising a first polymer, a second layer comprising a conductive material, the second layer disposed over the first layer, a third layer comprising a dielectric material, the third layer disposed over the second layer, positioning the multilayered structure within an injection mold, and injecting a second polymer into the mold and bonding the first layer to the second polymer to produce an electrostatically actuated device component. In an embodiment, the invention includes a method of injection molding a stator component for an electrostatically actuated valve.

26 Claims, 3 Drawing Sheets

U.S. PATENT DOCUMENTS

| | | | |
|---|---|---|---|
| 4,576,050 A | 3/1986 | Lambert | |
| 4,581,624 A | 4/1986 | O'Connor | |
| 4,651,564 A | 3/1987 | Johnson et al. | |
| 4,654,546 A | 3/1987 | Kirjavainen | |
| 4,710,419 A | 12/1987 | Gergory | |
| 4,722,360 A | 2/1988 | Odajima et al. | |
| 4,756,508 A | 7/1988 | Giachino et al. | |
| 4,821,999 A | 4/1989 | Ohtaka | |
| 4,898,200 A | 2/1990 | Odajima et al. | |
| 4,911,616 A | 3/1990 | Laumann, Jr. | |
| 4,912,288 A | 3/1990 | Atkinson et al. | |
| 4,938,742 A | 7/1990 | Smits | |
| 4,939,405 A | 7/1990 | Okuyama et al. | |
| 4,944,087 A | 7/1990 | Landi | |
| 4,985,601 A | 1/1991 | Hagner | |
| 4,996,391 A | 2/1991 | Schmidt | |
| 5,003,693 A | 4/1991 | Atkinson | |
| 5,008,496 A | 4/1991 | Schmidt | |
| 5,065,978 A | 11/1991 | Albarda et al. | |
| 5,069,419 A | 12/1991 | Jerman | |
| 5,078,581 A | 1/1992 | Blum et al. | |
| 5,082,242 A | 1/1992 | Bonne et al. | |
| 5,085,562 A | 2/1992 | van Lintel | |
| 5,096,388 A | 3/1992 | Weinberg | |
| 5,129,794 A | 7/1992 | Beatty | |
| 5,130,499 A | 7/1992 | Diijkshoorn | |
| 5,148,074 A | 9/1992 | Fujita et al. | |
| 5,153,385 A | 10/1992 | Juskey et al. | |
| 5,171,132 A | 12/1992 | Miyazaki et al. | |
| 5,176,358 A | 1/1993 | Bonne et al. | |
| 5,180,288 A | 1/1993 | Richter et al. | |
| 5,180,623 A | 1/1993 | Ohnstein | |
| 5,192,197 A | 3/1993 | Culp | |
| 5,206,557 A | 4/1993 | Bobbio | |
| 5,219,278 A | 6/1993 | van Lintel | |
| 5,220,488 A | 6/1993 | Denes et al. | |
| 5,220,489 A | 6/1993 | Barreto et al. | |
| 5,224,843 A | 7/1993 | van Lintel | |
| 5,241,133 A | 8/1993 | Mullen, III et al. | |
| 5,241,454 A | 8/1993 | Ameen et al. | |
| 5,244,527 A | 9/1993 | Aoyagi | |
| 5,244,537 A | 9/1993 | Ohnstein | |
| 5,253,010 A | 10/1993 | Oku et al. | |
| 5,322,258 A | 6/1994 | Bosch et al. | |
| 5,323,999 A | 6/1994 | Bonne et al. | |
| 5,325,880 A | 7/1994 | Johnson et al. | |
| 5,441,597 A | 8/1995 | Bonne et al. | |
| 5,452,878 A | 9/1995 | Gravesen et al. | |
| 5,499,909 A | 3/1996 | Yamada et al. | |
| 5,541,465 A | 7/1996 | Higuchi et al. | |
| 5,552,654 A | 9/1996 | Konno et al. | |
| 5,571,401 A | 11/1996 | Lewis et al. | |
| 5,642,015 A | 6/1997 | Whitehead et al. | |
| 5,683,159 A | 11/1997 | Johnson | |
| 5,725,363 A | 3/1998 | Bustgens et al. | |
| 5,759,014 A | 6/1998 | Van Lintel | |
| 5,759,015 A | 6/1998 | Van Lintel et al. | |
| 5,822,170 A | 10/1998 | Cabuz | |
| 5,836,750 A | 11/1998 | Cabuz | |
| 5,863,708 A | 1/1999 | Zanzucchi et al. | |
| 5,901,939 A | 5/1999 | Cabuz et al. | |
| 5,911,872 A | 6/1999 | Lewis et al. | |
| 5,941,501 A * | 8/1999 | Biegelsen et al. | 251/129.01 |
| 5,954,079 A | 9/1999 | Barth et al. | |
| 6,040,529 A | 3/2000 | Takeshita et al. | |
| 6,106,245 A | 8/2000 | Cabuz | |
| 6,160,962 A | 12/2000 | Nomura et al. | |
| 6,179,586 B1 | 1/2001 | Herb et al. | |
| 6,182,941 B1 | 2/2001 | Scheurenbrand et al. | |
| 6,184,607 B1 | 2/2001 | Cabuz et al. | |
| 6,215,221 B1 | 4/2001 | Cabuz et al. | |
| 6,240,944 B1 | 6/2001 | Ohnstein et al. | |
| 6,288,343 B1 | 9/2001 | Ahn et al. | |
| 6,288,472 B1 | 9/2001 | Cabuz et al. | |
| 6,307,751 B1 | 10/2001 | Bodony et al. | |
| 6,320,137 B1 | 11/2001 | Bonser et al. | |
| 6,675,470 B2 | 1/2004 | Muramatsu et al. | |
| 6,768,654 B2 * | 7/2004 | Arnold et al. | 361/818 |
| 6,837,476 B2 | 1/2005 | Cabuz et al. | |
| 6,858,921 B2 | 2/2005 | Kashiwagi et al. | |
| 6,915,566 B2 | 7/2005 | Abbott et al. | |
| 6,968,862 B2 | 11/2005 | Cabuz et al. | |
| 2003/0136576 A1 | 7/2003 | Joly et al. | |
| 2005/0001767 A1 * | 1/2005 | Wulff et al. | 343/700 MS |
| 2005/0011668 A1 | 1/2005 | Hwang et al. | |
| 2005/0122700 A1 | 6/2005 | Kim et al. | |
| 2007/0257398 A1 * | 11/2007 | Moncrieff | 264/272.11 |

FOREIGN PATENT DOCUMENTS

| | | |
|---|---|---|
| EP | 0253892 | 1/1988 |
| EP | 0744821 A2 | 11/1996 |
| EP | 0744821 A3 | 12/1996 |
| JP | 05-219760 | 8/1993 |
| JP | 02-86258 | 10/1995 |
| SU | 744877 | 6/1980 |
| WO | WO-9001251 A1 | 2/1990 |
| WO | WO 9729538 | 8/1997 |

OTHER PUBLICATIONS

Cabuz et al, "The Dual Diaphragm Pump", *The 14th IEEE International Conference on MEMS*, pp. 519-522 (2001).

"Large-Scale Linearization Circuit for Electrostatic Motors" IBM Technical Disclosure Bulletin, US. IBM Corp. New York, vol. 37, No. 10, Oct. 1, 1994, pp. 563-564, XP000475777, ISN: 0018-8689.

Athavale et al., "Coupled Electrostatics-Structures-Fluidic Simulations of a Bead Mesopump," Proceedings of the International Mechanical Engineers Congress & Exhibition, Nashville, Tennessee, Oct. 1999.

B. Halg, "On a Nonvolatile Memory Cell Based on Micro-Electro-Mechanics", Proceedings of MEMS CH2832-4/90/0000-0172 IEEE (1990), pp. 172-176.

Bertz, Schubert, Werner, "Silicon Grooves With Sidewall Angles Down to 1° made By Dry Etching", pp. 331-339, Microsystem Technologies '94 (Oct. 19-21, 1994).

Branebjerg, Gravesen, "A New Electrostatic Actuator Providing Improved Stroke Length and Force." Micro Elctro Mechanical Systems '92 (Feb. 4-7, 1992), pp. 6-11.

Bustgens, Bacher, Menz, Schomburg, "Micropump Manufactured by Thermoplastic Molding" MEMS 1994, pp. 18-21.

C. Cabuz et al., "Factors Enhancing the Reliability of Touch-Mode Electrostatic Actuators," Sensors and Actuators 79(2000) pp. 245-250.

C. Cabuz et al., "Mesoscopic Sampler Based on 3D Array of Electrostatically Activated Diaphragms," Proceedings of the 10th Int. Conf. On Solid-State Sensors and Actuators, Transducers '99, Jun. 7-12, 1999, Sendai Japan.

C. Cabuz et al., "The Double Diaphragm Pump," The 14th IEEE International Micro Electro Mechanical Systems conference, MEMS '01, Jan. 21-23, Interlachen, Switzerland.

C. Cabuz, et al., "High Reliability Touch-Mode Electrostatic Actuators", Technical Digest of the Solid State Sensor and Actuator Workshop, Hilton Head, S.C., Jun. 8-11, 1998, pp. 296-299.

C. Cabuz. Tradeoffs in MEMS Material (Invited Paper) Proceedings of the SPIE, vol. 2881, pp. 160-170, Austin, TX., Jul. 1996.

Cabuz, Cleopatra, "Electrical Phenomena at the Interface of Rolling-Contact, Electrostatic Actuators", Nanotribology: Critical Assessment and Research Needs, Kluwer Academic Publisher, pp. 221-236, Copyright 2003, presented at the Nanotribology Workshop, Mar. 13-15, 2000.

Cleo Cabuz, "Dielectric Related Effects in Micromachined Electrostatic Actuators," Annual Report of the IEEE/CEIDP Society, 1999, Annual Meeting, Austin, Texas, Oct. 17-20, 1999.

Jye-Shane Yang et al., "Fluorescent Porous Polymer Films as TNT Chemosensors: Electronic and Structural Effects", *J. Am. Chem. Soc.*, 1998, 120, pp. 11864-11873.

Jye-Shane Yang et al., "Porous Shape Persistent Fluorescent Polymer Films: An Approach to TNT Sensory Materials", *J. Am. Chem. Soc.*, 1998, 120, pp. 5321-5322.

Michael S. Freund et al., "A Chemically Diverse Conducting Polymer-Based 'Electronic Nose'", Proceedings of the National Academy of Sciences of the United States of America, vol. 92, No. 7, Mar. 28, 1995, pp. 2652-2656.

Minami K et al., "Fabrication of Distributed Electrostatic Micro Actuator (DEMA)" Journal of Microelectromechanical Systems, US, IEEE Inc., New York, vol. 2, No. 3, Sep. 1, 1993, pp. 121-127, XP000426532, ISSN: 1057-7157.

Porex Technologies, brochure, dated prior to Jun. 2, 2000, 4 pages.

Shikida, Sato, "Characteristics of an Electrostatically-Driven Gas Valve Under High Pressure Conditions, IEEE 1994, pp. 235-240."

Shikida, Sato, Harada, "Fabrication of an S-Shaped Microactuator," Journal of Microelectromechanical Systems, vol. 6, No. 1 (Mar. 1997), pp. 18-24.

Shikida, Sato, Tanaka, Kawamura, Fujisaki, "Electrostatically Driven Gas Valve With High Conductance", Journal of Microelectromechanical Systems, vol. 3, No. 2 (Jun. 1994), pp. 76-80.

Srinivasan et al., "Self-Assembled Fluorocarbon Films for Enhanced Stiction Reduction", Transducers '97, 1997 International Conference on Solid-State Sensors and Actuators, Chicago, Jun. 16-19, 1997, pp. 1399-1402.

Wagner, Quenzer, Hoerscelmann, Lisec, Juerss, "Bistable Microvalve with Pneumatically Coupled Membranes," 0-7803-2985-6/96, IEEE (1996), pp. 384-388.

* cited by examiner

US 8,007,704 B2

INSERT MOLDED ACTUATOR COMPONENTS

FIELD OF THE INVENTION

The present invention relates to electrostatically actuated device components and methods of making the same.

BACKGROUND OF THE INVENTION

Many industrial, commercial, aerospace, military and other applications depend on reliable valves for fluid (including gas) handling. For example, in a chemical plant valves are often used to control the flow of fluid throughout the facility. Likewise, in an airplane, valves are often used to control air and fuel delivery, as well as some of the hydraulic systems that drive the control surfaces of the airplane. These are just a few examples of the many applications that depend on reliable valves for fluid handling.

It is often desirable to minimize the power and/or voltage required to operate valves, particularly in wireless applications but also in other applications. Some low voltage/power valves are known in the art. However, many low voltage/power valves and their components have a relatively high fabrication cost.

SUMMARY OF THE INVENTION

The present invention relates to electrostatically actuated device components and methods of making the same. In an embodiment, the invention includes a method of making an electrostatically actuated device component including providing a multilayered structure comprising a first layer comprising a first polymer, a second layer comprising a conductive material, the second layer disposed over the first layer, a third layer comprising a dielectric material, the third layer disposed over the second layer, the third layer having a surface roughness of less than about 1000 angstroms, positioning the multilayered structure within an injection mold, and injecting a second polymer into the mold and bonding the first layer to the second polymer to produce an electrostatically actuated device component.

In an embodiment, the invention includes a method of injection molding a stator component for an electrostatically actuated valve including disposing a planar conductive assembly within an injection mold, the planar conductive assembly including a support layer comprising a first polymer, a conductive layer comprising a first side and a second side, the first side coupled to the support layer, a dielectric layer comprising a second polymer, the dielectric layer covering the entirety of the second side of the conductive layer, and injecting a third polymer into the injection mold to produce a stator component.

In an embodiment, the invention includes a method of forming a component of an electrostatically actuated device including extruding a first polymer to form a support layer, disposing a conductive material on the support layer to form a conductive layer extending continuously over the support layer, disposing a dielectric material on the conductive layer to form a dielectric layer having a surface roughness (Rq) of between about 100 angstroms and 1000 angstroms, placing the support layer, the conductive layer, and the dielectric layer within an injection mold defining a cavity, with the support layer facing the interior of the cavity, filling the cavity with a second polymer to form the component of the electrostatically actuated device, and removing the component of the electrostatically actuated device from the injection mold.

The above summary of the present invention is not intended to describe each discussed embodiment of the present invention. This is the purpose of the figures and the detailed description that follows.

DRAWINGS

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

Figure 1:
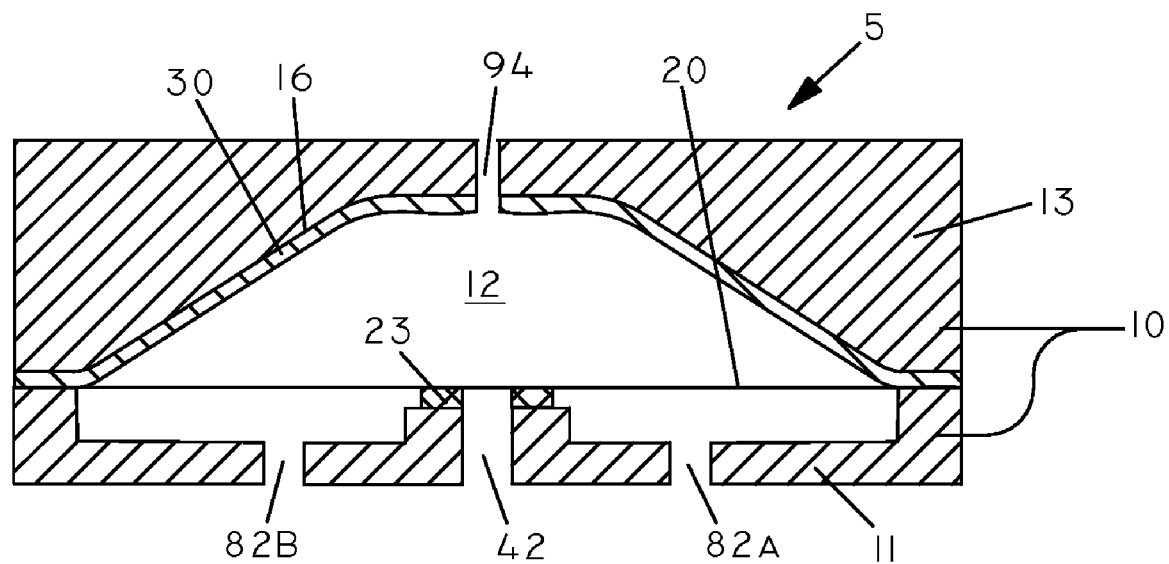
FIG. 1 is a cross-sectional side view of an illustrative normally closed valve in accordance with an embodiment of the present invention.

Embodiments of the invention include methods of making electrostatically actuated device components in a manner that can reduce fabrication costs. In an embodiment, the invention includes methods for injection molding electrostatically actuated device components. FIG. 1 is a cross-sectional side view of one type of valve 5 made in accordance with an embodiment of the present invention. In this embodiment, the valve 5 is of a type that is normally closed. The valve 5 has a body 10 with an upper body portion 13 and a lower body portion 11. The upper body portion 13 includes a chamber wall 16. The chamber wall 16 defines a valve chamber 12. In the illustrative embodiment, a first port 42 (e.g. inlet port) extends through the lower body portion 11 into the valve chamber 12.

A diaphragm 20 is mounted within the chamber 12. In the embodiment of FIG. 1, the diaphragm 20 is spaced from the lower body portion 11 except along a valve seat 23, which extends around the first port 42. The lower body portion 11 defines one or more output ports 82a and 82b. In the un-actuated state, the diaphragm 20 can be configured so that the diaphragm 20 covers the valve seat 23 and restricts fluid flow through the first port 42 and out the output ports 82a and 82b. To actuate the valve 5, the diaphragm 20 includes one or more electrodes, which can extend to the edges of the chamber 12. In some embodiments, the one or more electrodes of the diaphragm 20 are surrounded or encapsulated in a dielectric material or layer.

Figure 2:
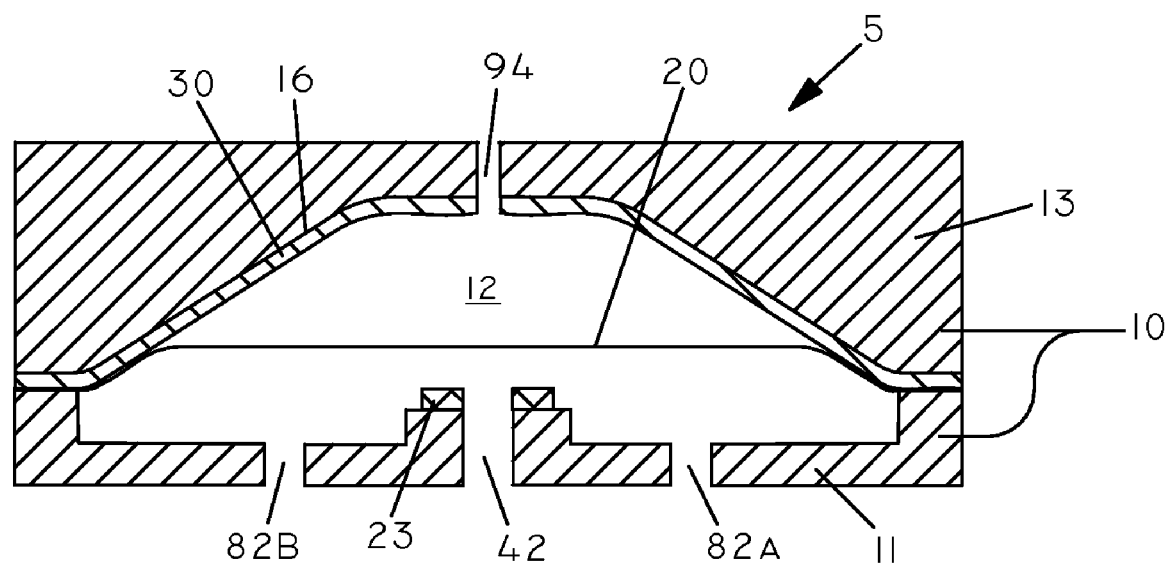
FIG. 2 is a cross-sectional side view of the valve of FIG. 1 in an open position.

In the embodiment shown in FIG. 1, the chamber wall 16 includes one or more stationary electrodes, such as electrode 30. The chamber wall 16 and the diaphragm 20 can be configured so that, in the un-activated state, the separation distance between the stationary electrode 30 and the electrode of the diaphragm 20 is smaller near the edges of the chamber 12. Referring now to FIG. 2, when a voltage is applied between the electrode of the diaphragm 20 and the stationary electrode 30, the diaphragm 20 is drawn toward the chamber wall 16 in a rolling action such that the portions of the diaphragm 20 near the edges of the chamber wall 16 are drawn toward the chamber wall 16 first, followed by portions of the diaphragm farther away from the edges of the chamber wall 16. Such a rolling action can improve efficiency and reduce the voltage requirements of the valve. When the diaphragm 20 is electrostatically actuated and pulled toward the chamber wall 16, the diaphragm can move away from the valve seat 23 and uncover the first port 42. This can allow fluid to flow between the first port 42 and the output ports 82a and 82b. One or more back pressure relief ports or vent openings 94 may be provided in the upper body portion 13 to relieve any back pressure that might arise because of displacement of the diaphragm 20.

In some embodiments, the diaphragm 20 may become elastically deformed when electrostatically pulled toward the chamber wall 16. When so provided, the diaphragm 20 may return to the un-activated first position under elastic restoring forces when the activation voltage is removed or reduced between the electrode of the diaphragm 20 and the electrode 30 of the chamber wall 16. In this embodiment, the diaphragm 20 may only need to be electrostatically actuated in one direction, with the elastic restoring forces returning the diaphragm 20 to the original un-actuated state.

The upper body portion 13 and lower body portion 11 may be made from any suitable semi-rigid or rigid material, such as plastic, ceramic, silicon, etc. In an embodiment, upper body portion 13 and lower body portion 11 are constructed by molding a high temperature plastic such as ULTEM-1000™ (available from General Electric Company, Pittsfield, Mass.), CELAZOLE™ (available from Hoechst-Celanese Corporation, Summit, N.J.), KETRON™ (available from Polymer Corporation, Reading, Pa.), or the like.

It will be appreciated that the valve 5 shown in FIGS. 1 and 2 is only one example of a valve configuration that may be made in accordance with embodiments of the invention, but that many other components and configurations are contemplated herein. By way of example, embodiments of the invention can be used to make components for valves that are normally open, valves having different shapes, electrostatically actuated pumps, and the like.

Figure 3:
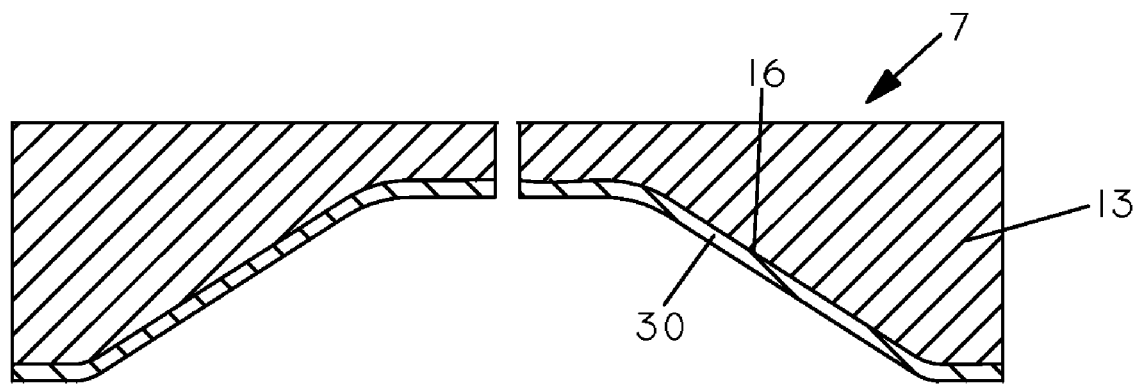
FIG. 3 is a cross-sectional side view of a valve stator in accordance with an embodiment of the present invention.

Referring now to FIG. 3, the upper body portion 13, the chamber wall 16, and the electrode 30 can together be considered a stator 7 in an electrostatically actuating valve structure. It will be appreciated that the stator 7 can be manufactured in various ways. In some embodiments of the invention, the stator 7 is manufactured using an injection molding process.

Injection molding involves injecting molten plastic into a mold at high pressure; the mold being the inverse of the desired shape. Many different types of injection molding machines can be used. One example of an injection molding machine that can be used is the Sumitomo SE7M, available from Sumitomo Plastics Machinery, Norcross, Ga. In many injection molding machines, resin pellets are poured into a feed hopper, which feeds the granules down to a screw or auger. The screw is turned by a hydraulic or electric motor that turns the screw feeding the pellets up the screw's grooves. As the screw rotates, the pellets are moved forward in the screw and they undergo extreme pressure and friction which generates most of the heat needed to melt the pellets. Heaters on either side of the screw assist in the heating and temperature control around the pellets during the melting process.

The molten material is then forced into the mold under pressure and fills up a cavity inside the mold. The material is then allowed to cool and solidifies creating the part.

Figure 4:
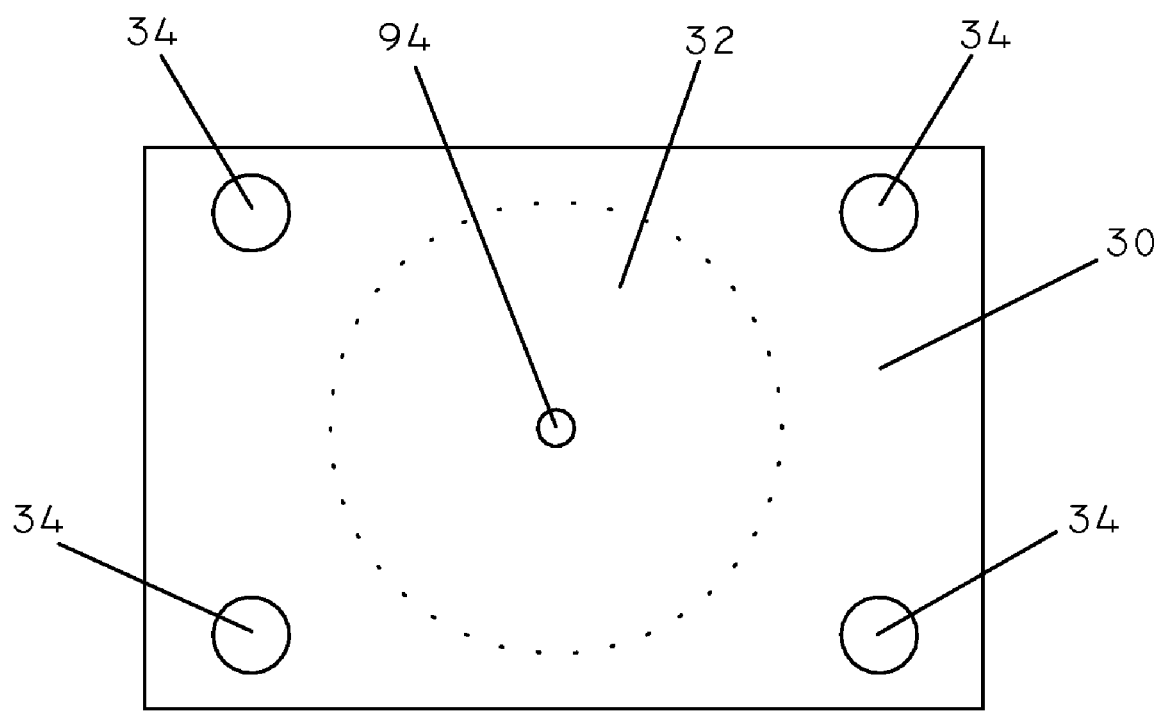
FIG. 4 is a bottom view of a valve stator in accordance with an embodiment of the invention.

FIG. 4 is a bottom view of a valve stator in accordance with an embodiment of the invention. In this embodiment, the electrode 30 is shown with a vent opening 94 in the middle of a domed portion 32. A plurality of post holes 34 are present and configured to receive corresponding posts that can help hold the valve structure together.

Figure 5:
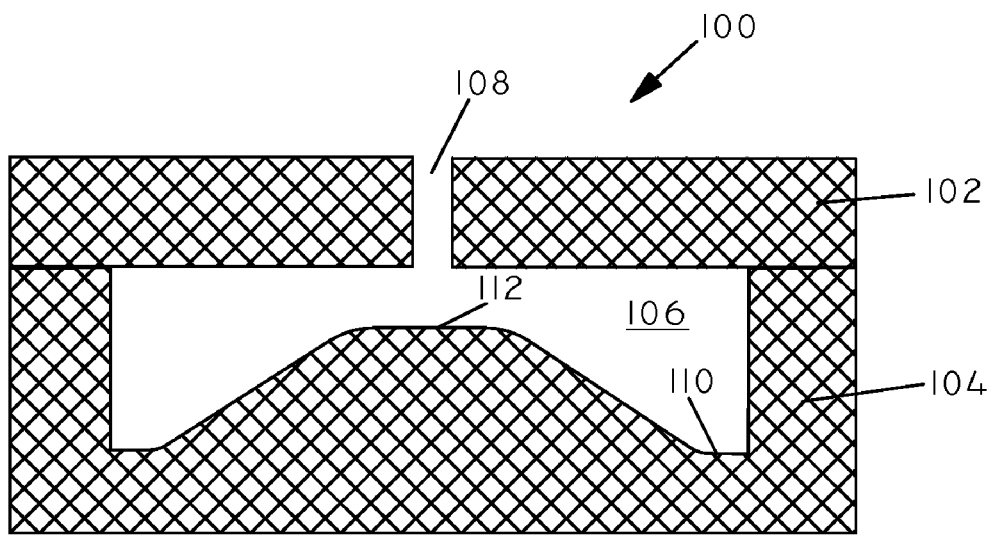
FIG. 5 is a schematic cross-sectional view of an injection mold in accordance with an embodiment of the invention.

FIG. 5 shows an injection mold 100 that can be used in some embodiments of the invention. The injection mold 100 includes a top half 102 (core half) and a bottom half 104 (cavity half). The top half 102 and the bottom half 104 enclose a molding cavity 106. The molding cavity 106 can have walls that are slightly angled to facilitate removal of parts from the mold 100. The top half 102 defines an injection port 108. The bottom half includes an interior surface 110 and a dome 112 (not to scale). Molten material which is injected into the mold 100 will take the shape of the molding cavity 106. The top half 102 and the bottom half 104 can be separated from one another in order to facilitate removal of the resulting molded part.

As described previously, the stator 7 can include an electrode 30. The electrode 30 can be covered by a layer of dielectric material. The electrode 30 may be disposed onto the chamber wall 16 in various ways. For example, the electrode 30 could be affixed onto the chamber wall 16 with an adhesive, or it could be painted, sprayed, or dip coated onto the chamber wall 16.

Figure 6:
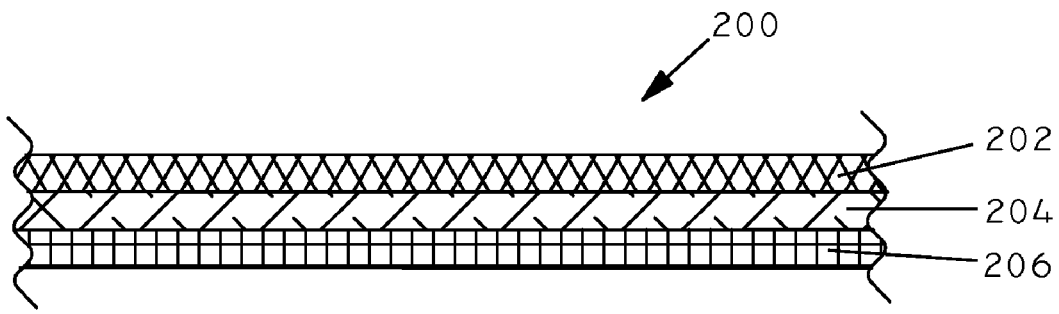
FIG. 6 is a cross-sectional side view of a multilayered structure in accordance with an embodiment of the invention.

In some embodiments, an electrode 30 is disposed onto the chamber wall 16 by first positioning a multilayered structure, including a conductive layer, within an injection mold and then injecting a molten polymer to form the stator. This type of process can be referred to as insert injection molding. FIG. 6 shows an exemplary multilayered structure 200 that can be used in an injection molding method of the invention. The multilayered structure 200 can include a dielectric layer 202 disposed over a conductive layer 204. The dielectric layer 202 can serve as an insulator between the conductive layer 204 and the electrode on the diaphragm. As such, in an embodiment, the dielectric layer 202 extends continuously over the conductive layer 204. The conductive layer 204 can, in turn, be disposed over a polymeric support layer 206. The polymeric support layer 206 can serve as a substrate for deposition of the conductive layer 204 and can facilitate sufficient attachment of the multilayered structure 200 to the chamber wall 16. While not shown, the multilayered structure 200 can define one or more apertures to accommodate various features such as the one or more back pressure relief ports or vent openings 94 in the upper body portion 13.

Figure 7:
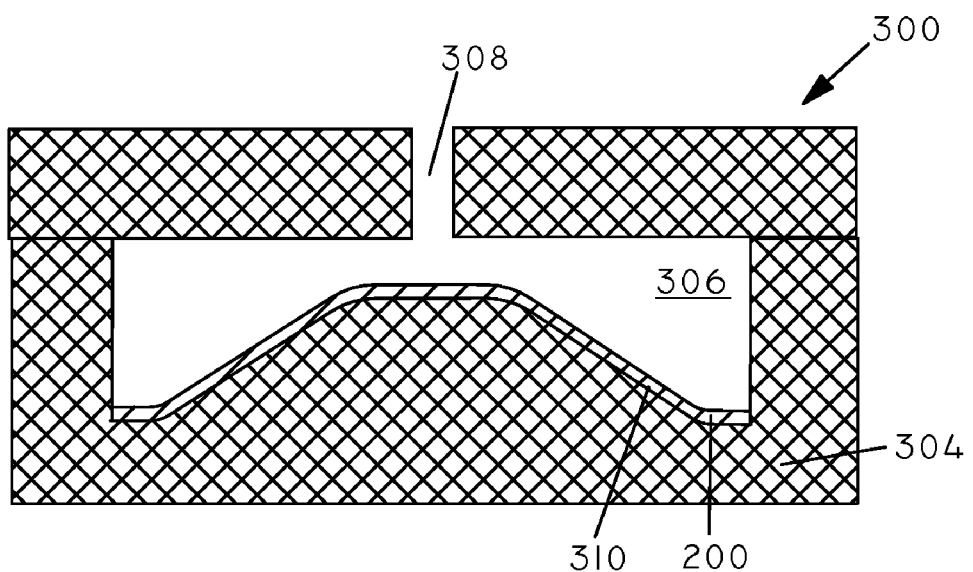
FIG. 7 is a schematic illustration of an injection mold with a multilayered structure disposed therein in accordance with an embodiment of the invention.

Referring now to FIG. 7, a multilayered structure 200 is shown disposed within the cavity 306 of a mold 300. In this embodiment, the multilayered structure 200 is positioned against the interior surface 310 of the bottom half 304 of the mold 300. Specifically, the multilayered structure 200 is positioned with the dielectric layer 202 adjacent to the interior surface 310 so that the polymeric support layer 206 is facing the cavity 306. Molten material can then pass into the cavity 306 through an injection port 308 and then be solidified to form a molded stator. In some embodiments, the heat from the molten material can cause the polymeric support layer 206 to partially melt and form a tight bond with the molten material as it solidifies.

The polymeric support layer 206 of the multilayered structure 200 may be formed in various ways. In one embodiment, the polymeric support layer 206 is formed by an extrusion process. By way of example, a thermoplastic polymer, such as such as ULTEM-1000™ (polyetherimide) (available from General Electric Company, Pittsfield, Mass.) or KAPTON™ (available from DuPont Electronic Technologies, Circleville, Ohio) can be extruded to form a continuous sheet or layer that serves as the polymeric support layer 206. The polymeric support layer 206 should be sufficiently thick so as to provide a suitable substrate for the deposition of the conductive layer 204. The polymeric support layer 206 should be sufficiently thin so as to not reduce the flexibility of the multilayered structure 200 too much. In some embodiments, the polymeric support layer 206 is between about 10 microns to about 100 microns thick. In various embodiments, the polymeric support layer 206 is about 30, 40, 50, 60, or 70 microns thick.

The conductive layer 204 may be formed by printing, plating or electron beam-physical vapor deposition (EB-PVD) of metal. In some cases, the conductive layer 204 may be patterned using a dry film resist. In an embodiment, the conductive layer 204 is deposited onto the support layer 206 using thermal evaporation techniques under vacuum. In an embodiment, the conductive layer 204 extends continuously over the polymeric support layer 206. Various techniques can be used to increase the adhesion between the conductive layer 204 and the polymeric support layer 206. In an embodiment, the support layer 206 is plasma-treated before the conductive layer 204 is applied.

In some embodiments, such as where the conductive layer 204 is vapor deposited onto the support layer 206, the conductive layer 204 will have surface roughness similar to the surface roughness of the underlying support layer 206. In an embodiment, the support layer 206 has a surface root mean square (Rq) roughness of less than about 1000 angstroms. In an embodiment, the support layer 206 has a surface roughness (Rq) of greater than about 100 angstroms. In an embodiment, the support layer 206 has a surface roughness (Rq) of between about 100 angstroms and 1000 angstroms.

The conductive layer 204 can include many different materials. In an embodiment, the conductive layer 204 includes a metal. Exemplary metals can include gold, platinum, copper, aluminum, and the like. In an embodiment, the metal is of a high purity. By way of example, the metal can be about 99.99% pure. In some embodiments, the metal is about 99.999% pure, 99.9999% pure, or even 99.99999% pure.

The conductive layer 204 can be from about 50 to about 500 angstroms thick. In an embodiment, the conductive layer can be about 100, 200, or 300 angstroms thick. The conductive layer can have a resistivity that is appropriate for configuration as an electrode on the stator. In an embodiment, the resistivity of the conductive layer is 10, 8, 6, 4, or 2 Ohms/square or lower.

The roughness of the conductive layer 204 can affect the adherence of the dielectric layer 202 to the conductive layer 204. Surface roughness can be measured using equipment such as the DekTak line profilometer (available from Veeco Instruments Inc., Woobury, N.Y.) which drags a stylus along the surface of a test substrate for a distance such as a 1 millimeter length. One standard measure of roughness that can be automatically calculated by line profilometers (such as the DekTak) is the root mean square roughness (Rq). The Rq roughness is the root mean square average of the departures of the roughness profile from the mean line. Rq roughness is also defined in ANSI B46.1. It has been found that a surface roughness (Rq) on the conductive layer 204 of less than about 100 angstroms (e.g., smoother than 100 angstroms) can lead to insufficient adhesion between the dielectric layer 202 and the conductive layer 204. Conversely, a surface roughness (Rq) of greater than about 1000 angstroms (e.g., rougher than 1000 angstroms) can result in making the dielectric layer 202 too rough for reliable and consistent actuation of the valve. In an embodiment, the conductive layer 204 has a surface roughness (Rq) of less than about 1000 angstroms. In an embodiment, the conductive layer 204 has a surface roughness (Rq) of greater than about 100 angstroms. In an embodiment, the conductive layer 204 has a surface roughness (Rq) of between about 100 angstroms and 1000 angstroms.

The dielectric layer 202 is adhered to the conductive layer 204 with sufficient strength to resist separation from the conductive layer 204 during repeated actuation of an electrostatic valve. The dielectric layer 202 can be deposited onto the conductive layer 204 using a variety of techniques. In some embodiments, it can be spray coated, roller coated, dip coated, or applied using a variety of printing techniques. In some embodiments, the dielectric layer is applied using a flash evaporation technique. In some embodiments, the dielectric layer is subjected to UV light treatment after application in order to cure the dielectric layer.

In some embodiments, such as where the dielectric layer 202 is applied using a flash evaporation technique, the dielectric layer 202 will have surface roughness similar to the surface roughness of the underlying conductive layer 204. In an embodiment, the dielectric layer 202 has a surface roughness (Rq) of less than about 1000 angstroms. In an embodiment, the dielectric layer 202 has a surface roughness (Rq) of greater than about 100 angstroms. In an embodiment, the dielectric layer 202 has a surface roughness (Rq) of between about 100 angstroms and 1000 angstroms.

After the multilayered structure 200 is used in insert molding to form a stator 7, the dielectric layer 202 is on the surface of the stator 7 facing the valve chamber 12. As the electrostatic valve depends on a rolling action for actuation, surface defects on the dielectric layer 202 can adversely affect the performance of the valve and in some cases cause it to cease actuating. Accordingly, in an embodiment, the dielectric layer 202 is substantially free of surface defects.

The dielectric layer 202 can include a variety of materials. By way of example, the dielectric layer 202 can include oxides, such as aluminum oxide. In some embodiments, the dielectric layer 202 includes one or more polymers. It will be appreciated that various polymers have dielectric properties. The dielectric layer can include polymers such as fluoropolymers (such as PTFE and fluoroacrylates), acrylate polymers, polysiloxanes (silicone), polyimides (such as polymethylglutarimide), parylene and the like.

The dielectric properties of a material may be gauged by its dielectric constant. The dielectric layer should have sufficient dielectric properties to be able to insulate the conductive layer from the electrode of the diaphragm. In an embodiment, the material of the dielectric layer can have a dielectric constant of between about 3.0 and about 4.0. In an embodiment, the material of the dielectric layer can have a dielectric constant of about 3.5. The dielectric properties of the dielectric layer are also influenced by the thickness of the dielectric layer. In an embodiment, the dielectric layer is between about 0.1 microns and about 5 microns. In a particular embodiment, the dielectric layer is between about 0.45 and about 0.55 microns thick.

The surface energy of the dielectric layer can affect how easily the diaphragm releases from the electrode on the chamber wall of the valve. In an embodiment, the surface energy of the dielectric layer is less than or equal to about 30 dynes per centimeter.

It will be appreciated that, although the implementation of the invention described above is directed to electrostatically actuated valve components, methods of the present device may be used with other electrostatically actuated devices such pumps and the like, and is not limited to valves or valve components. In addition, while the present invention has been described with reference to several particular implementations, those skilled in the art will recognize that many changes may be made hereto without departing from the spirit and scope of the present invention.

We claim:

1. A method of making an electrostatically actuated device component for an electrostatically actuated device, comprising:
   providing a multilayered structure comprising a first layer comprising a first polymer;
      a second layer comprising a conductive material, the second layer disposed over the first layer; and
      a third layer comprising a dielectric material, the third layer disposed over the second layer, the third layer having a surface roughness (Rq) of greater than about 100 angstroms to less than about 1000 angstroms;
   positioning the multilayered structure within an injection mold such that when a second polymer is injected into the injection mold, the second polymer engages the first polymer of the first layer but does not significantly engage the third layer; and
   injecting the second polymer into the injection mold and forming a bond between the first polymer of the first layer and the second polymer to produce an electrostatically actuated device component that has the third layer of the multilayered structure being exposed in order to selectively contact an electrostatically actuated diaphragm of an electrostatically actuated device.

2. The method of claim 1, wherein providing the multilayered structure comprises forming the multilayered structure by depositing the conductive material on the first polymer and depositing the dielectric material on the conductive material.

3. The method of claim 2, wherein the conductive material is vapor deposited onto the first polymer.

4. The method of claim 2, wherein the dielectric material is vapor deposited onto the conductive material.

5. The method of claim 1, the dielectric material extending continuously over the conductive material.

6. The method of claim 1, the electrostatically actuated device comprising a valve.

7. The method of claim 1, the electrostatically actuated device component comprising a stator.

8. The method of claim 1, the second layer having a surface roughness (Rq) of about 100 angstroms to about 1000 angstroms.

9. The method of claim 1, the conductive material extending continuously over the first layer.

10. The method of claim 9, the dielectric material extending continuously over the conductive material.

11. The method of claim 1, the multilayered structure comprising one or more apertures.

12. The method of claim 1, the injection mold defining a dome having a surface, the dome surface having a roughness (Rq) of about 100 angstroms to about 1000 angstroms.

13. The method of claim 12, wherein positioning the multilayered structure within an injection mold comprises positioning the multilayered structure within the injection mold with the third layer adjacent to the surface of the dome.

14. The method of claim 1, further comprising discarding electrostatically actuated device components having a third layer roughness (Rq) of greater than about 1000 angstroms.

15. The method of claim 1, further comprising the step of joining the electrostatically actuated device component with a lower body portion with an electrostatically actuated diaphragm positioned therebetween to form an electrostatically actuated device.

16. The method of claim 1, wherein the second polymer comprises one or more high temperature plastics.

17. The method of claim 1, wherein the conductive material of the second layer comprises one or more of gold, platinum, copper and aluminum.

18. The method of claim 1, wherein the conductive material has a resistance that is 10 Ohms/square or less.

19. The method of claim 1, wherein the dielectric material of the third layer comprises one or more of aluminum oxide, fluoropolymers, acrylate polymers, polysiloxanes, polyimides, and parylene.

20. The method of claim 1, wherein the dielectric material of the third layer has a dielectric constant between about 3.0 and 4.0.

21. The method of claim 1, wherein the dielectric material of the third layer has a thickness of between about 0.1 microns and 5 microns.

22. A method of injection molding a stator component for an electrostatically actuated valve comprising:
   disposing a planar conductive assembly within an injection mold, the planar conductive assembly comprising:
      a support layer comprising a first polymer;
      a conductive layer comprising a first side and a second side, the first side coupled to the support layer, the conductive layer having a thickness of between about 50 angstroms and 500 angstroms; and
      a dielectric layer comprising a second polymer, the dielectric layer covering the second side of the conductive layer the dielectric layer having a surface roughness (Rq) of between about 100 angstroms and 1000 angstroms; and
   injecting a third polymer into the injection mold to produce a stator component.

23. The method of claim 22, the conductive layer extending continuously over the support layer.

24. The method of claim 22, further comprising the step of joining the stator component with a lower body portion with an electrostatically actuated diaphragm positioned therebetween to form an electrostatically actuated valve.

25. A method of forming a component of an electrostatically actuated device comprising:
   extruding a first polymer to form a support layer;
   disposing a conductive material on the support layer to form a conductive layer extending continuously over the support layer;
   disposing a dielectric material on the conductive layer to form a dielectric layer having a surface roughness (Rq) of between about 100 angstroms and 1000 angstroms;
   placing the support layer, the conductive layer, and the dielectric layer within an injection mold defining a cavity, with the support layer facing the interior of the cavity;
   filling the cavity with a second polymer to form the component of the electrostatically actuated device; and
   removing the component of the electrostatically actuated device from the injection mold;
   wherein the finished component includes the dielectric layer attached to the conductive layer on a first side, and exposed to atmosphere on an opposing side.

26. The method of claim 25, further comprising the step of joining the finished component with a lower body portion with an electrostatically actuated diaphragm positioned therebetween to form an electrostatically actuated device.

* * * * *